May 23, 1950 S. J. BEGUN ET AL 2,508,485

DEVICE TO PREVENT ACCIDENTAL ERASURE OF MAGNETIC RECORDS

Filed Feb. 25, 1947 3 Sheets-Sheet 1

INVENTOR.
J.P. ARNDT, JR.
S.J. BEGUN

BY [signature]

ATTORNEY

S. J. BEGUN
J. P. ARNDT, JR.
[signature]

S. J. BEGUN
J. P. ARNDT, JR.
W D Prueler

Patented May 23, 1950 2,508,485

UNITED STATES PATENT OFFICE 2,508,485

DEVICE TO PREVENT ACCIDENTAL ERASURE OF MAGNETIC RECORDS

Semi Joseph Begun, Cleveland Heights, and John P. Arndt, Jr., Euclid, Ohio, assignors to The Brush Development Company, Cleveland, Ohio, a corporation of Ohio Application February 25, 1947, Serial No. 730,868

7 Claims. (Cl. 179—100.2)

This invention relates to a magnetic recording apparatus for recording, erasing or reproducing magnetic signals on a moving magnetic record track.

Among the objects of this invention are novel magnetic recording and reproducing devices embodying features which make it impossible to inadvertently erase or superimpose recording flux on a magnetic record which it is desired to keep intact.

The foregoing and other objects of the invention will be best understood from the following description of exemplifications thereof, reference being had to the accompanying drawings wherein Fig. 1 illustrates a magnetic recording and reproducing apparatus according to the invention;

In the wide use of home type magnetic recording and reproducing apparatus it is extensively possible for laymen to prepare very high quality recordings at home. Radio programs, for example, can be excellently recorded on limp magnetic recording tapes having a stratum of bonding compound containing substantially uniformly dispersed therein permanently magnetizable powder particles, such as are described in the copending applications of Otto Kornei, Serial Nos. 685,092 and 685,093, now abandoned, filed July 20, 1946. For certain purposes, as for example, when a desired recording is not available in any other manner a reel of magnetic recording medium having magnetically recorded thereon such a recording may be purchased.

Hitherto all magnetic recorders have been made with a single magnetic track guide path for erasing, recording or reproducing. The ease of making magnetic recordings or of erasing prior magnetic recordings may often be disastrous to a commercial recording which can easily be run through such prior recorders with the control switch inadvertently set to "erase" or "record," and in a few minutes erase an expensive recording to nothing but a blank magnetic track which can be readily purchased at small cost, or superimpose another recording and thereby ruin the expensive recording beyond recovery of anything but the blank record track.

According to the invention this difficulty is avoided by providing record track structures having an elongated record track channel suitably held in compact form as for example, on a record track reel or sheet and imparting to the record track structures of the commercial recordings a dimension to which the home type recording and reproducing apparatus is sensitive and which does not permit the alteration of the recording. The features of the invention may be utilized with conventional reels of record track in the form of either wire or tape or with endless reels such as those illustrated in the Miller application, Serial No. 588,911 filed April 18, 1945, now U. S. Patent No. 2,426,838, issued September 2, 1947.

Figure 1:
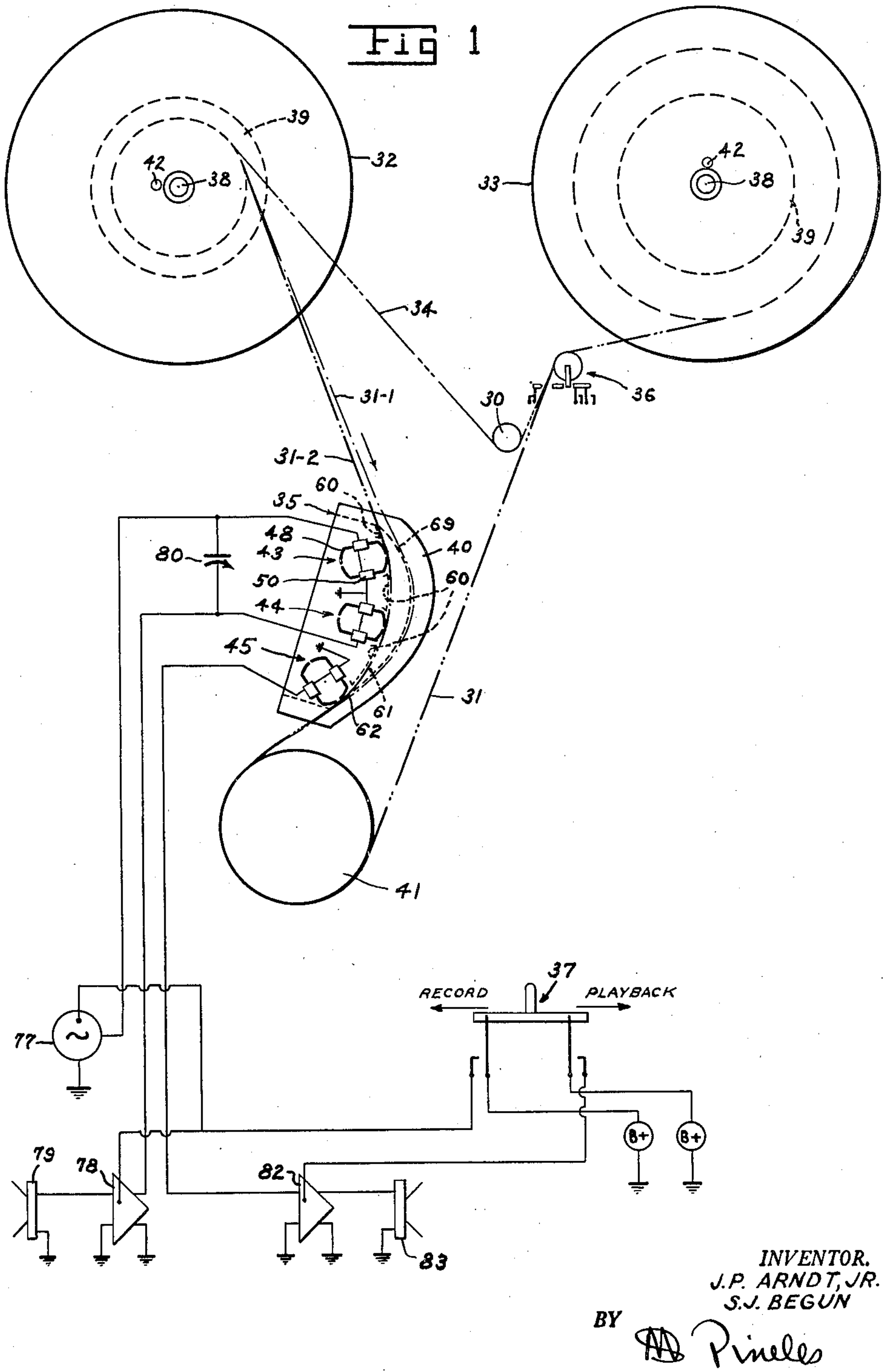
Fig. 1A is an enlarged view of one form of magnetic head assembly embodying the invention.

In Fig. 1 is shown diagrammatically one embodiment of the invention wherein a magnetic record track in the form of a tape 31 is unwound from a supply reel 32 and wound onto a take-up reel 33. A magnetic head assembly structure 35 having a guide portion 40 is disposed so that the record tape 31 is led over the guide portion 40 and around a rotating capstan 41. The capstan shown includes heavy portions and the tape contacts the roller portion of the capstan along a maximum amount of its periphery. The large moment of inertia of the capstan helps to impart constancy to its rotation, and the large area of contact with the tape provides good driving means for withdrawing the tape over the guide portion 40 of the magnetic head assembly structure 35, and for feeding the tape to the take-up reel 33. A limit switch assembly 36 is interposed in the record track path to assist in controlling the record track reeling operations. The head assembly 35 contains three magnetic heads, an erasing head 43, a recording head 44, and a reproducing head 45.

The guide structure 40 provides a guide surface defining an outer guide path 69 and guide surfaces 60 defining an inner guide path 61, both guide paths approaching each other at their extreme portions. The reproducing head 45 is placed in contact with the combined guide paths in that portion 62 of the head assembly 35 adjacent to the zone where the record track 31 leaves the head assembly in its forward reeling path from the supply reel 32 to the take-up reel 33, as indicated by the arrow. For rewinding an additional roller 30 may be mounted to provide a rewind guide path, such as is indicated by the dash-triple-dot line 34, which bypasses the capstan 41 and the head assembly 35.

The erasing head 43 and the reproducing head 44 are placed in contact with the inner guide path 61 where it is separated from the outer guide path 69 so that the tape 31 in moving along the outer guide path 69, as indicated by the dash-dot line 31—1, does not contact the erasing or recording heads 43, 44 and only contacts the reproducing head 45. In this outer guide path 69 the record track is beyond the magnetic influence of the erasing and recording heads 43, 44, and erasing and recording operations cannot be effected. Along the inner guide path, as indicated by the dash-double-dot line 31—2, the record track contacts all three magnetic heads so that erasing, recording and reproducing, or any combination of these, may be effected. The magnetic heads 43, 44, 45 may be identical, each containing a magnetic core 48 surrounded by transducing windings 50, as is well known in the art.

Fig. 1 indicates a wiring diagram that may be used for controlling the recording and playback operations. One terminal of the windings of each core is grounded. The other terminal of the recording head 44 is connected to the output of recording amplifier 78, the other terminal of the playback head 45 being connected to the input of playback amplifier 82, and the ungrounded terminal of the erasing head 43 to the output of the high frequency oscillator 77.

A suitable signal source, such as the microphone 79, feeds the input of recording amplifier 78, and a signal reproducing device, such as the loud speaker 83, is fed by the output of reproducing amplifier 82, the circuits being completed by the ground connections shown. A capacitor 80 feeds some of the high frequency output of oscillator 77 to the recording head 44 so as to provide the necessary A. C. bias for recording. Switch 37 acts to selectively connect suitable power sources, indicated by the circled B+ signs, to the amplifier 82, or to the amplifier 78 and high frequency oscillator 77 so that in the left-hand record position, when record track is present in the inner guide path, the recording amplifier 78 provides a recording flux in the recording head 44, and the oscillator 77 simultaneously provides an erasing flux in the erasing head 43 and an A. C. biasing flux in the recording head. The exclusion of record track from the inner guide path 61, as by constraining it to travel along the outer guide path 69, makes recording and/or erasing impossible because record track in outer path 69 is not magnetically linked with these cores.

In the right-hand playback position the switch 37 disconnects the oscillator 77 and the amplifier 78 from the power supply, and connects the playback amplifier 82 with its power supply so that recordings may be reproduced in the reproducer 83. The switch 37 in the intermediate position shown disconnects all power supplies so that the apparatus is inoperative.

The reels 32, 33, shown distorted as to size, are mounted on rotatable shafts 38, shown as having collars 39 upon which the reels rest. Projecting from the upper surface of collars 39 are pins 42 which are engaged by corresponding openings of the hubs of the reels and serve to transmit rotational forces from the shafts to the reels. Suitable means may be provided for actuation of the shafts 38 and the capstan for effecting the desired reeling operations as is well known in the art.

The selection of the guide path along which the record track moves is placed beyond the control of the operator, as for example, by suitably shaping the walls bounding the guide structure 40 so that record tracks of one shape will be moved along the inner guide path 61, whereas record tracks of other shapes will not be permitted to enter the lower guide path 61 and will be held away and move along the outer guide path 69.

Figures 1A, 2, 7:
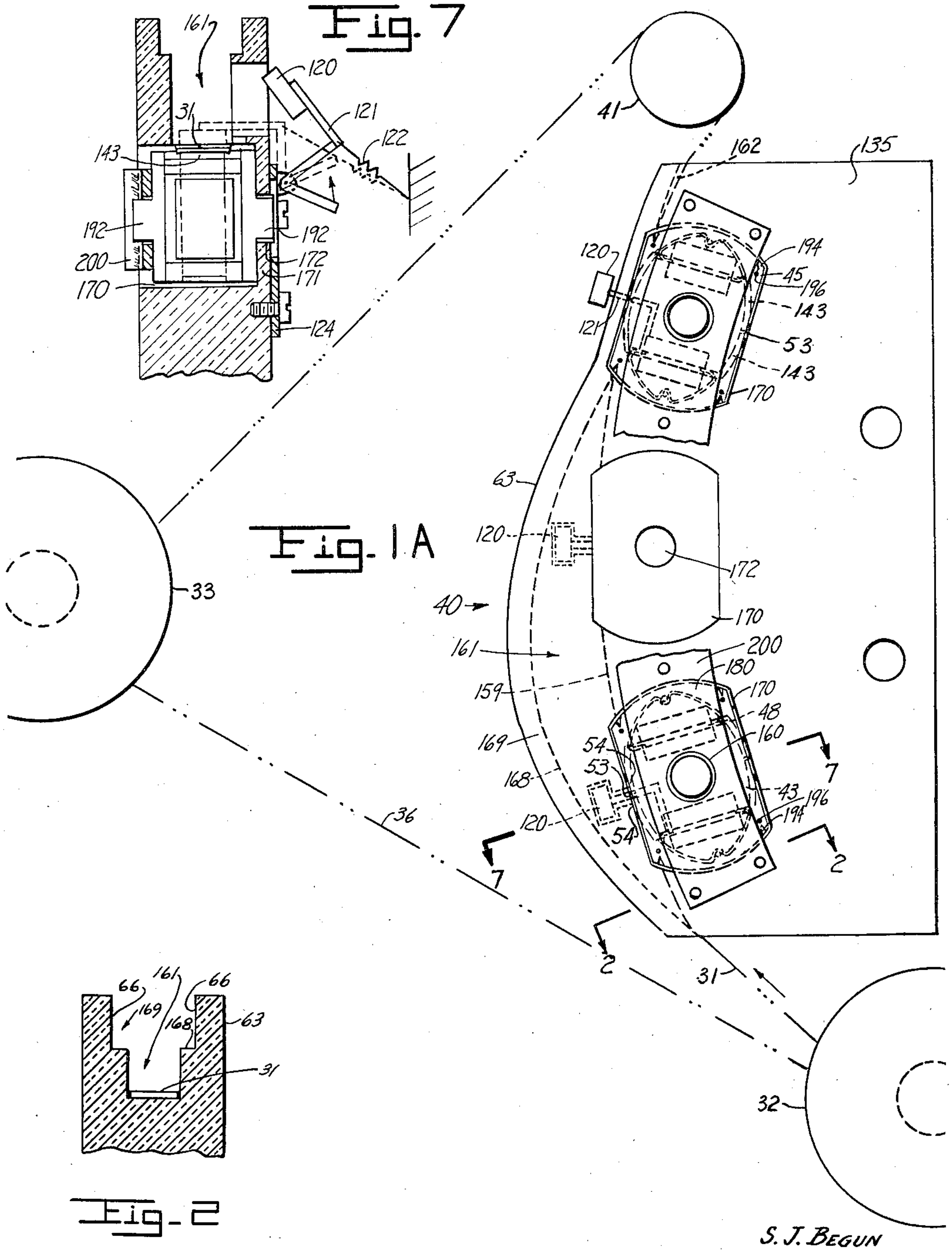
Fig. 2 is a sectional view of the assembly structure of the head assembly of Fig. 1A along line 2—2.
Fig. 7 is a cross-section of the head of Fig. 1A along the line 7—7.

Fig. 1A is an enlarged view showing in greater detail the construction of a head assembly 135 according to the invention. The head assembly 135 be molded or machined as an integral member having side walls 63 and three laterally disposed openings 170. Along the guide portion 40 of the head assembly 135 a deep channel 161 is provided, the floor 159 of this channel defining an inner record track guide path.

A portion of the walls 63 that define the sides of the guide channel 161 are hollowed, as indicated at 66 in Fig. 2, to provide internal shoulders 168 extending over most of the length of the guide portion 40. The shoulders 168 are situated externally of the floor 159 of the channel 161 and define the two marginal regions of another guide channel 169. The guide channels 161, 169 are convexly shaped and the distance between the respective floors 159, 168 varies along the assembly structure 135 in a manner similar to that shown in Fig. 1, being at maximum in an intermediate zone and decreasing to zero at the ends of the channel.

The openings 170 extend through the floor 159 but do not extend completely through the thickness of the head assembly 135, leaving a wall 171, as indicated in Figs. 1A and 7. Smaller passageways 172 extend through the wall 171 axially of and communicate with the openings 170.

Magnetic heads 180 are placed within the openings 170, as indicated in Fig. 1A wherein only two of the heads, the erasing head 43 and the playback head 45, are shown mounted in place. Each of the heads contains a magnetic core 48 which may be made up of two generally C-shaped thin pole pieces 143 mounted so as to form a substantially closed magnetic path including two small non-magnetic gaps 53. Each of the pole pieces 143 may be surrounded by a transducing winding 150.

As shown in greater detail in Figs. 4, 5, 6 and 6A, the magnetic head 180 is formed by mounting the pole pieces 143 on a mounting member 181 so shaped as to receive the pole pieces 143 as well as the transducing windings 150, the heads 180 being disposed so that one of the pole piece gaps 53 as well as the surrounding pole portions 54 are exposed along the general contour of the floor 159. The mounting member 181 is shown as a molded or machined unit having two generally flat sides 190 each with a periphery which has convex regions 183 and flat regions 184 so as to provide a contour which generally resembles that of openings 170. On each of the flat sides are a pair of inwardly directed shoulders 187 as well as pole piece supporting structures 188. The pole piece supports 188 integrally connect the opposing sides 190 of the mounting member 181. Centrally projecting exteriorly from each side 190 is a circular boss 192 shaped to fit in the passageway 172. A groove 186 extends transversely through the mounting member 181 between the pole piece supports 188 and accommodates the windings 150. The pole pieces 143, intermediate regions of which carry the windings 150, are mounted on the pole piece supporting structures 188 so that the windings fit inside the groove 186 and the pole portions 54 of the two pole pieces disposed near the flat faces and are spaced by a suitable non-magnetic gap. A small groove 193 may be provided in the pole piece supporting structures 188 immediately below the non-magnetic gap region so as to facilitate the adjustment of the gap. C-shaped leaf springs 195 shown supported against pins fitting through openings 197 in the sides 190 are shown as urging the pole pieces 143 against the pole piece supports 188 so as to retain the pole pieces in place. Some of the lateral faces of the pole piece supports 188 may be cut away to provide small wedge-shaped gaps 199 under the pole pieces 143. The urging by spring 195 causes the pole pieces to bend slightly into the gaps 199 and makes for more secure assembly.

The entire magnetic head construction is similar to that described in the application of Otto Kornei, Serial No. 688,034, filed August 2, 1946, now abandoned, and is positioned in opening 170 so that the shoulders 187 form a general continuation of the surface of the floor 159 and the pole portions 54 of the pole pieces emerge above the floor to a very small extent to provide a slight amount of increased tension on the tape as it is impelled along a guide channel. To help in such positioning of the magnetic heads, the opening 170 may be slightly larger than the mounting member 181 and the passageway 172 slightly larger than the boss 192 so that when a fastening plate 200 containing corresponding apertures 160 is mounted against the exposed side 190 and around the exposed bosses 192 the bosses will project from both sides of the assembly structure 35 and can be grasped and moved to properly position the head before the plate 200 is securely fixed in place.

As shown the reproducing head is mounted in the terminal portion of the assembly structure 135 where the channels are at the same level. The erasing and recording heads are mounted in the floor 159 of narrower channel 161 in those regions where the ledges 158 are some distance removed from this floor 159, as shown. The magnetic heads may be identical in which case, they should be wide enough to accommodate the wider tape passing through channel 169 since the reproducing head must operate in conjunction with either tape. Such a construction is indicated in Fig. 7 wherein the extra head width does not interfere with its operation in the narrower channel 161. It is obvious, however, that the reproducing head 45 may have a tape guiding width larger than the corresponding width of magnetic heads 42 and 43.

With the arrangement illustrated commercial recordings on tape too wide to fit into narrow guide channel 161 may be obtained and run through the assembly structure 135 with no possibility of erasing or superimposed recording taking place. On the other hand, there may also be obtained reels of record tape narrow enough to fit into the guide channel 161, and on such narrow tapes radio programs, telephone conversations or other sound sequences may be recorded, erased and re-recorded at will. Any inadvertent setting of the controls to "record" or "erase" will have no effect on the wider tape.

Figure 3:
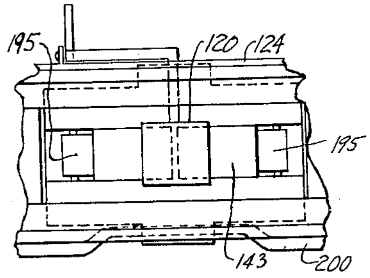
Fig. 3 is a top view of the head construction of Fig. 1A.
Figure 4:
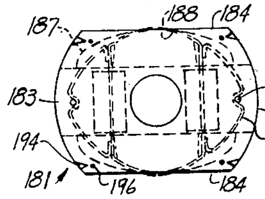
Fig. 4 is a side view of a mounting member for one of the magnetic cores of Fig. 1A, the magnetic core being shown in dotted lines.
Figure 5:
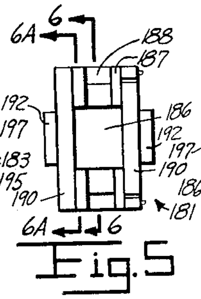
Fig. 5 is an end view of the mounting member of Fig. 4.
Figure 6:
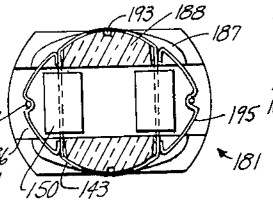
Fig. 6 is a cross-section of the mounting members of Figs. 4 and 5 along the line 6—6 and showing the magnetic core.
Figure 6A:
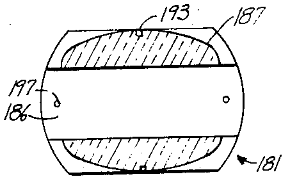
Fig. 6A is a cross-section of the mounting member of Figs. 4 and 5 along the line 6A—6A.

In a practical construction, such as is shown in Figs. 1 through 7, the convexity of the floor 159 of the narrower channel 161 in the assembly structure 135 is minimized so as to diminish the frictional forces against the tape as it slides along the assembly structure 135. With the small convexity of floor 159, not enough pressure is applied between the tape and the pole portions 54 of the magnetic heads, and pads 120 are provided and mounted on pivoted arms 121 so disposed that by actuation of the arms 121, into the operative position shown in dotted lines in Fig. 7, the pads 120 will rest on the tape and press it against the pole portions 54 so as to maintain stable magnetic contact and linkage between the magnetic core and the successive elements of the magnetic tape as they pass the gap 53. Enough freedom of rotation is provided for the arms 121 so that in the non-operative position, shown by the solid lines of Fig. 7, the pads 120 are completely removed from the guide channels to enable simple threading of the tape along the channel. The pads may be made of felt or other soft resilient material. The arms 121 may be offset, as shown in Fig. 3, so as not to obstruct the easy access to the adjacent projecting boss 192 and may be pivoted on a plate 124 attached to the lower side of assembly structure 135. The assembly structure may be provided with fastening means, as shown, to securely hold it suitably positioned in the apparatus. The dash-triple-dot line 34 shown in Fig. 1 is the path along which the tape may be rapidly wound from one reel to another without passing in contact with any of the magnetic heads. The path 34 may be used for rewinding or fast forward reeling. In the drawing the record tape thickness is greatly exaggerated in the interest of clarity.

The guiding of narrow tape through the narrow channel 161 will satisfactorily center it on the reproducing head 43 which is only provided with wider guides. If desired, however, additional narrow guide means may be provided on the capstan side of reproducing head 45, as for example, by grooving the floor of the channel at this point to form a narrow tape guide channel 162 shown in Fig. 1A.

Figure 8:
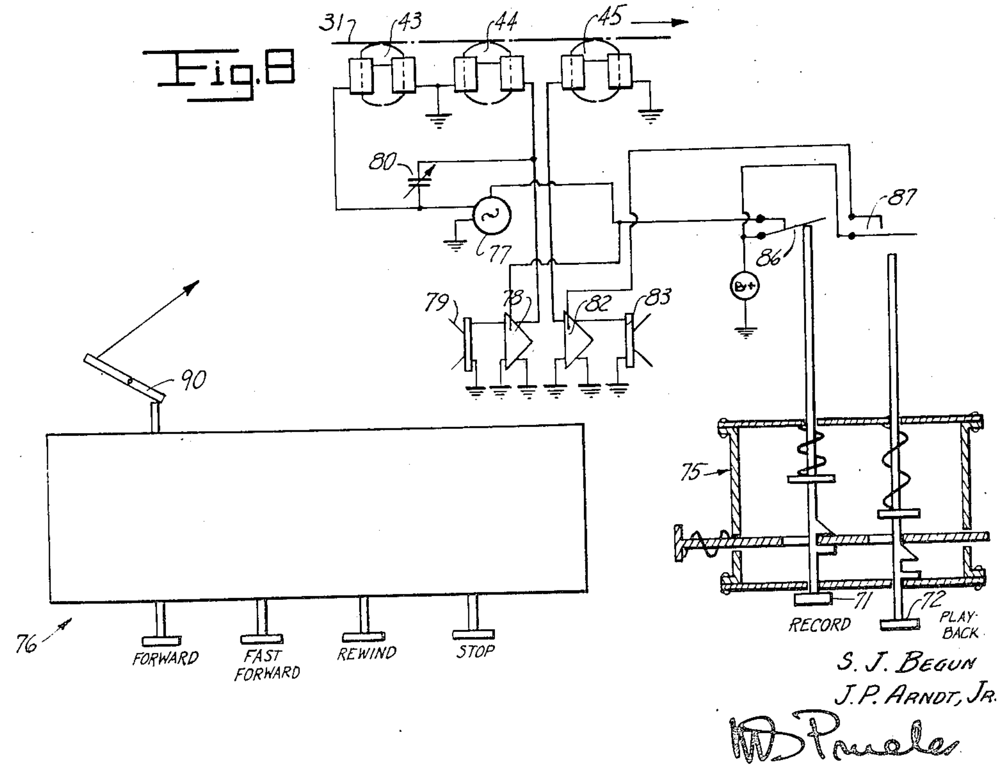
Fig. 8 illustrates a wiring diagram suitable for use with the invention.

The windings of the magnetic cores may be connected, as indicated in Fig. 8, wherein a pair of push buttons 71, 72 in the conventional two push button assembly 75, control respectively the recording and the playback operations. As is well known, the push button assembly is so arranged that either button is mounted on a rod which may be pushed into its operative position in which it is latched by a latch plate such as is shown by 73, and that when one is pushed in the other is unlatched and pops out under the action of a biasing spring 74. However, both buttons may be pushed in if simultaneously actuated.

On each core the windings are connected in series, one end of the erasing core windings being connected to an oscillator 77 and one end of the windings of the recording core 44 is connected to the output of recording amplifier 78 in an arrangement similar to that shown in Fig. 1. The playback core 45, playback amplifier 82, signal reproducing device 83, signal source 79 and variable coupling capacitor 80 are also similarly connected. The B+ supply for operating the oscillator 77 and the amplifiers 78, 82 is indicated by the circled B+ in Fig. 8 and is led to these units through switches 86, 87 which are operated by the shaft of the push buttons 71, 72 respectively, as shown. With the record button pushed in and the playback button out the B+ is supplied to the recording amplifier 78 and the oscillator 77 so that a proper recording of signals may be obtained. Pushing in the playback button 72 permits the recording button 71 to pop out and removes the B+ supply from the recording amplifier 78 and the oscillator 77, and establishes a B+ supply to the playback amplifier 82, thus permitting the reproduction of the recording. By suitable manipulation both recording button 71 and playback button 72 may be maintained in their operative inwardly pushed position so that a recording may be made and immediately played back for monitoring or other purposes. In a practical embodiment of the apparatus the connections to the windings 150 may be made by means of pins 196 mounted in one side 190 of the mounting member 181, the ends of the windings being led over notches 194 and fastened to pins 196.

Other operating means, such as the second push button assembly 76, may be used to control the tape impelling means so as to operate the tape in the regular forward direction for recording or reproducing, rapidly in forward direction for quickly locating a desired spot in a long recording, or in rewind direction for rapidly rewinding. Driving means, such as motors, may be suitably mounted and connected with the supply reel 32, take-up reel 33 and the capstan 41, and may be suitably connected with switches operated by the push buttons of the assembly 76. Mechanical or electrical interlinkage may be provided for actuating the arms 121 when the forward push button is pushed so as to bring the pads 120 into contact with the tape to establish stable magnetic linkages with the respective magnetic heads. A biasing spring 122 is shown for retracting the arms 121 into inoperative position when the forward push button is in its outer or inoperative position, as for example, when any of the other buttons of assembly 76 is pushed in. The assembly 76 may also contain another push button for stopping the impelling of the tape as by unlatching the other push buttons when desired. A lever 90 may be mounted adjacent the switch assembly 76 and mechanically linked with the arms 121 so that operation of the forward push button will rotate the lever 90 and pull the pads 120 down into operating position.

If desired, the recording and playback amplifier may be combined in which case the switch assembly 75 may be revised so as to suitably connect the altered amplifier input and output as required for recording or playback position. With such construction a supplementary playback amplifier and a supplementary recording amplifier may be used as taught in the application by Otto Kornei, Serial No. 685,092, filed July 20, 1946. This application also shows the switching arrangement which may be employed. It is, of course, understood that simultaneous recording and playback cannot be effected with such a combined amplifier arrangement.

So-called permanent recordings may be made on tape too wide to move along channels 161 and 162 so that it is directed into the outer guide path 169 by the floor 168 of the guide assembly. The guiding portions 190 of the magnetic heads 43, 44 may be wide enough to admit only the narrow record tracks, and the corresponding guiding portions of reproducing head 45 may be wide enough to receive the wide record tracks.

Threading of the tape for the operation of the apparatus may be effected by simply guiding the tape from the supply reel over the periphery of the guide assembly, then around the capstan roller 41, and from there onto the take-up reel in a manner similar to that shown in Fig. 1. Beginning of the reeling operation will cause tensioning forces to appear in the portion of the record track between the supply reel 32 and the capstan roller 41, and these tensioning forces will urge the record track inwardly toward the magnetic heads. The guide will control this inward motion of the record track stopping it at the outer guide path if it is wider than the critical width and permitting it to move to the record track path if it is narrower than the critical width.

The magnetic tapes of differing widths may be supplied on reels or holders having different tape receiving dimensions but of the same overall width. The narrow tape receiving spacing may be centrally disposed with respect to the wide tape receiving spacing to insure the proper feeding of the narrow tape path along the transverse central portion of the wide tape path. If desired, however, the tapes may be supplied on reels of different overall widths, in which case two levels of reel mounting may be provided on the reel mounting shafts 38.

Although Figs. 1 through 8 are shown as employed with record tracks in the form of a tape, similar constructions may be used for wire type magnetic record tracks in accordance with the invention. A wire guide path may be defined by a grooved guide structure in which the groove admits a narrow wire but does not permit the entry of a wider wire. The pads 120 are unnecessary for use with wire type record tracks.

The pole face width of the erasing core may be wider than the corresponding widths of the recording core and playback core to insure that all recording and playback be effected on record track that has been properly erased. Furthermore, when different recording and playback cores are used, it is highly advantageous to make the pole face width of the recording core different from the corresponding width of the playback core. Making these cores of the same width permits slight variation in alignment of one core with respect to the other to greatly effect the playback level since part of the recorded signals will be out of range of the playback core. However, a difference in width enables the maintenance of constant playback level in spite of appreciable misalignment. If the pole faces of the recording core are the wider ones, the playback pole faces will respond to a constant width of recorded signals so long as the misalignment still maintains the playback pole faces within the limits of the width of the recording pole faces. If the playback pole faces are the wider ones, the entire recorded signal width will be played back so long as misalignment still maintains the playback pole faces spanning the entire width of the recording pole faces.

According to another phase of the invention the playback pole faces may be made wider than the narrower record track channel so as to take fuller advantage of the width of the wider record track usable for commercial non-erasable recordings. In such constructions the effective width of the erasing pole faces is no larger than the narrower tape channel and may be larger than the width of the recording pole faces of the transducer head assembly. The playback pole faces may, for the reasons given above, also be of a width different from the pole faces used to make the commercial recordings.

It is also important that the pole gaps of the recording and playback heads be disposed at the proper angle with respect to the record track width to avoid the distorting effects of simultaneously playing back chronologically adjacent parts of a recording.

It is obvious that other modifications of record track reeling arrangements may be used without affecting the invention. For example, the capstan roller 41 may be thin and the record track may be pressed against it for frictional engagement. Also, the rewind guide path may be substantially identical with the forward reeling guide paths in which case the pole faces may be burnished and the record track may be disengaged from the high inertia members of the capstan for high speed reeling or rewinding.

Additionally, other signal recording techniques, such as the D. C. bias method, may be employed. The erasing core may be omitted if desired in which case the blank record track may be supplied in proper magnetic condition for direct recording, the features of the invention being then utilized for preventing superimposed recording.

In place of the magnetic cores shown in Figs. 1A and 4 through 6A, other cores such as those shown in the Begun application Serial No. 688,738, filed August 6, 1946 may be used. The ring shaped cores formed of only a single lamination of sheet metal of a thickness of the order of four to fourteen mills, having only a small non-magnetic gap, and extending substantially entirely on one side of the record track guide path are especially useful in that they are extremely sensitive and efficient.

According to another phase of the invention disclosed herein, a magnetic recording system for preventing inadvertent erasure or damage to a desired program recorded on a magnetic recording medium by superposition thereon of another magnetic recording is designed in accordance with the principles explained below. For the purpose of this explanation the phrase "commercial" magnetic record structure or recording medium means a magnetic recording structure or medium which it is desired to retain and which is to be protected against damage by inadvertent erasure or by subjecting it to another recording flux or the like; and a home magnetic record structure or a magnetic recording medium means a magnetic record structure or medium on which previous records may be erased and new recordings made, for instance, by the owner of a magnetic home recorder, or in general by a user who desires to record his own programs. In accordance with the invention such commercial recording medium or record structure utilizes as a magnetic recording medium permanently magnetizable elements which exhibit such a high coercive force that a program recorded thereon cannot be obliterated or erased or harmed by subjecting it to the action of either the erasing flux or the recording flux produced by the magnetic recording equipment of the home recording device; and the home recording medium or record structure utilizes, on the other hand, a recording medium embodying permanently magnetizable magnetic elements which exhibit a coercive force sufficiently lower than that exhibited by the commercial recording medium, as to make it possible to erase the home recording medium and to make new magnetic records thereon by the magnetic transducing heads of the home recorder. By way of an example the magnetic recording medium of the home recorder may have permanently magnetizable magnetic elements exhibiting a coercive force of 120 oersted, whereas the commercial magnetic recording medium is made with the permanently magnetizable magnetic elements exhibiting a coercive force of about 500 to 600 oersted so that magnetic flux which is sufficient to saturate the permanently magnetizable particles of the home recording medium is not sufficient to materially affect the magnetic condition of the magnetic particles of the commercial recording medium exhibiting a coercive force of about 500 to 600 oersted, or more.

The expression "magnetic record transducing" as used herein in the specification and claims is intended to mean either the operation of magnetically recording signals on a magnetic recording medium, or the operation of reproducing magnetically recorded signals, or the operation of erasing magnetically recorded signals, or any combination of two or more of these operations.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described above.

We claim:

1. In a magnetic record transducing apparatus for transducing signals on an elongated magnetic record track reeled in coil form on a supply reel and having a guide structure including spaced surface elements defining at least two alternate record track guide paths along which the record track is moved during transducing operations; said paths including a common path portion; rotatable reel mounting means for receiving the supply reel; record track impelling means for moving the record track along any one of the guide paths and unreeling it from the supply reel; magnetic erasing core elements positioned for magnetic flux linkage with the successive portions of a record track moving along one of the alternate guide paths and out of magnetic flux linkage with a record track moving along a different alternate guide path; and a magnetic playback core having pole portions spaced by a non-magnetic gap and positioned for magnetic flux linkage with the successive portions of a record track moving along said common path portion; said guide surface elements being positioned to co-act with a predetermined dimension of the record track to guide the record track along one of said alternate guide paths when the predetermined dimension is below a distinguishing value and to guide the record track along a different alternate guide path when the predetermined dimension is above the distinguishing value for preventing inadvertent exposure of record tracks of predetermined dimensional characteristics to the magnetic erasing flux.

2. In a magnetic record transducing apparatus for transducing signals on an elongated magnetic record track reeled in coil form on a supply reel and having a guide structure including surface elements defining at least two alternate record track guide paths along which the record track is moved during transducing operations; said paths including a common path portion; rotatable reel mounting means for receiving the supply reel; record track impelling means for impelling the record track along any one of the guide paths and unreeling it from the supply reel; magnetic recording core elements positioned for magnetic flux linkage with the successive portions of a record track moving along one of the alternate guide paths and out of magnetic flux linkage with a record track moving in a different alternate guide path; magnetic playback core elements positioned for magnetic flux linkage with the successive portions of a record track moving along said common path portion; said guide surface elements being positioned to co-act with a predetermined dimension of the record track to selectively guide the record track along one of said alternate guide paths when the predetermined dimension is below a distinguishing value and to guide the record track along a different alternate guide path when the predetermined dimension is above the distinguishing value, for preventing inadvertent exposure of record tracks of predetermined dimensional characteristics to the magnetic recording flux.

3. In a magnetic record transducing apparatus for transducing signals on an elongated magnetic record track reeled in coil form on a supply reel and having a guide structure including surface elements defining at least two alternate record track guide paths along which the record track is moved during transducing operations; said paths including a common path portion; rotatable reel mounting means for receiving the supply reel; record track impelling means for impelling the record track along any one of the guide paths and unreeling it from the supply reel; a magnetic flux-generating head having magnetic core portions positioned for magnetic flux linkage with the successive portions of a record track moving along one of the alternate guide paths to subject the elements of the record track so moving to the action of the flux generated by said core, and out of magnetic flux linkage with a record track moving along a different guide path; a magnetic playback head having magnetic core portions positioned for magnetic flux linkage with the successive portions of a record track moving along said common path portion; said guide surface elements being positioned to co-act with a predetermined dimension of the record track to selectively guide the record track along one of said alternate guide paths when the predetermined dimension is below a distinguishing value and to guide the record track along a different alternate guide path when the predetermined dimension is above the distinguishing value, for preventing inadvertent exposure of record tracks of predetermined dimensional characteristics to the magnetic flux of the flux-generating core.

4. In a magnetic record transducing apparatus for transducing signals on an elongated magnetic record track reeled in coil form on a supply reel and having a guide structure including spaced surface elements defining a pair of alternate record track guide paths along which the record track is moved during transducing operations; said paths including a common path portion; rotatable reel mounting means for receiving the supply reel; record track impelling means for impelling the record track along either one of the guide paths and unreeling it from the supply reel; a magnetic flux-generating head having core portions positioned for magnetic flux linkage with the successive portions of a record track moving along one of the alternate guide paths and out of magnetic flux linkage with a record track moving along the other guide path, for subjecting the elements of the record track moving along said one path to the action of the flux generated by said core; a magnetic playback head having core portions positioned for magnetic flux linkage with the successive portions of a record track moving along said common path portion; said guide surface elements forming part of spaced opposing side walls positioned to co-act with the width of the record track for selectively guiding the record track along one of said alternate guide paths when the record track width is less than a critical value and for guiding the record track along the other alternate guide path when the record track width is larger than the critical value, for preventing inadvertent exposure of record tracks of predetermined width to the magnetic flux of the flux-generating core.

5. A magnetic record transducing apparatus as defined by claim 3 including two magnetic flux-generating core portions positioned for magnetic flux linkage with the successive portions of a record track moving along one of the alternate guide paths and out of magnetic flux linkage with record tracks moving along a different guide path.

6. A magnetic record transducing apparatus as defined by claim 5 in which one of said flux-generating core portions is a magnetic record erasing core portion and the other of said flux-generating core portions is a magnetic recording core portion.

7. In a magnetic record transducing apparatus for transducing signals on an elongated magnetic record track reeled in coil form on a supply reel and having a guide structure including surface elements defining at least two alternate record track guide paths along which the record track is moved during transducing operations; said paths including a common path portion; rotatable reel mounting means for receiving the supply reel; record track impelling means for impelling the record track along any one of the guide paths and unreeling it from the supply reel; magnetic flux-generating core elements positioned for magnetic flux linkage with the successive portions of a record track moving along one of the alternate guide paths to subject the elements of the record track so moving to the action of the flux generated by said core elements, and out of magnetic flux linkage with a record track moving in a different alternate guide path; magnetic playback core elements having poles positioned for magnetic flux linkage with the successive portions of a record track moving along said common path portion; some of said guide surface elements having spaced opposite wall portions separated by a relatively small distance defining the width of an inner relatively narrow alternate guide path, other of said guide surface elements having spaced opposite wall portions separated by a relatively greater distance to define an outer relatively-wide alternate guide path, for permitting record tracks having a width less than said inner guide path to penetrate into said inner guide path and selectively preventing wider record tracks from being guided along said inner guide path.

SEMI JOSEPH BEGUN.
JOHN P. ARNDT, Jr.

REFERENCES CITED

The following references are of record in the file of this patent:

UNITED STATES PATENTS

| Number | Name | Date |
| --- | --- | --- |
| 789,336 | Poulsen | May 9, 1905 |
| 2,351,006 | Camras | June 13, 1944 |